UNITED STATES PATENT OFFICE 2,165,623

METHOD OF PRESERVING RUBBER AND PRODUCT THEREOF

Raymond F. Dunbrook and Bingham J. Humphrey, Akron, Ohio, assignors to The Firestone Tire & Rubber Company, Akron, Ohio, a corporation of Ohio No Drawing. Application December 21, 1936, Serial No. 117,005

12 Claims. (Cl. 18—50)

This invention relates especially to improved age-resisting rubber compositions and methods of making the same, and is of primary utility in the manufacture of carbon black rubber stocks, such as tire tread stocks, that are subject to light, heat, oxidation, abrasion, flexing, and other destructive agencies during use.

The chief objects of the invention are to provide a class of materials suitable for incorporating in rubber compositions to retard deterioration thereof; to improve the resistance of rubber to abrasion; and to check or retard the formation of cracks in carbon black rubber stocks. Other objects will be manifest as the specification proceeds.

This invention consists in the incorporation in rubber or rubber like organic materials, of an antioxidant or age retarding compound of the general class of 1,2-dihydroquinolines represented by the general formula

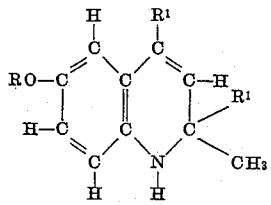

wherein $R^1$ is an alkyl radical, and R is an alkyl or aryl radical.

Example (a).—2,2,4-trimethyl-6-phenoxy-1,2-dihydroquinoline of the formula

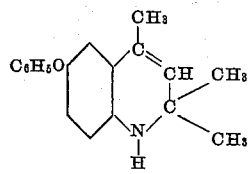

Example (b).—2,2,4-trimethyl-6-ethoxy-1,2-dihydroquinoline of the formula

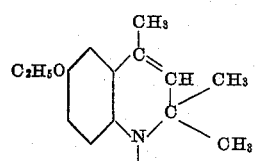

The foregoing illustrative examples of the improved antioxidant were tested by incorporating them in respective rubber mixes, vulcanizing the latter, and then comparing the resultant products with a control stock consisting of the same ingredients with the exception of the improved antioxidant, which was omitted. The composition of the mixes was as follows:

|  | Control | With improved antioxidant |
|---|---|---|
|  | Parts | Parts |
| Smoked sheet | 100 | 100 |
| Sulphur | 3 | 3 |
| Zinc oxide | 5 | 5 |
| Carbon black | 45 | 45 |
| Pine tar | 3 | 3 |
| Stearic acid | 3 | 3 |
| Mercaptobenzothiazole | 1.25 | 1.25 |
| Antioxidant | None | 1 |

The respective stocks were thoroughly mixed and then vulcanized under pressure for 120 minutes and 140 minutes at 264° F. Test strips were cut from the various vulcanized stocks, some of said strips being artificially aged for 46 hours in the Bierer Davis oxygen bomb at 70° C. and 300 pounds oxygen pressure. The results of these tests are as follows:

Normal data

| Formula | Modulus at 400% | | Tensile at break | |
|---|---|---|---|---|
|  | 120 | 140 | 120 | 140 |
| Control | 2350 | 2500 | 4375 | 4400 |
| (a) | 2850 | 3000 | 4125 | 4075 |
| (b) | 2275 | 2375 | 4500 | 4600 |

After aging 46 hours in oxygen bomb

| Formula | Modulus at 400% | | Tensile at break | |
|---|---|---|---|---|
|  | 120 | 140 | 120 | 140 |
| Control | 1825 | 1775 | 2325 | 2075 |
| (a) | 2450 | 2450 | 2900 | 2850 |
| (b) | 2500 | 2575 | 3575 | 3425 |

While the above data cover only specific compounds of the general class, it has been found that all members of the general class are advantageous in carrying out the objects of the invention. Though the processes and products defined in the claims are primarily useful in connection with vulcanized rubber, they are also effective in improving the aging qualities of unvulcanized rubber, for example in rubber latex compounds and in unvulcanized rubber compounds for tire repair purposes.

The foregoing data clearly show that the various stocks treated with the improved antioxidants compare favorably with untreated stock in normal condition, and after artificial aging, uniformly show superior modulus and tensile characteristics.

Modification may be resorted to, and the exact proportions of the constituent materials may be varied, and other materials having equivalent chemical properties may be employed if desired without departing from the spirit of the invention or the scope of the appended claims.

What is claimed is:

1. The method of retarding the deterioration of rubber compositions which comprises treating same with a 1, 2-dihydroquinoline having a methyl group and an alkyl radical in the 2 position, an alkyl radical in the 4 position and a member of the group consisting of the alkoxy and alkoxy and aroxyl radicals in the 6 position.

2. The method of retarding the deterioration of rubber compositions which comprises vulcanizing rubber in the presence of a 1, 2-dihydroquinoline having a methyl group and an alkyl radical in the 2 position, an alkyl radical in the 4 position and a member of the group consisting of the alkoxy and aroxy radicals in the 6 position.

3. The method of retarding the deterioration of rubber which comprises treating rubber with 2, 2, 4-trimethyl-6-ethoxy-1,-2-dihydroquinoline.

4. The method of retarding the deterioration of rubber which comprises vulcanizing rubber in the presence of 2, 2, 4-trimethyl-6-ethoxy-1, 2-dihydroquinoline.

5. A rubber product resulting from the method set forth in claim 1.

6. A vulcanized rubber product resulting from the method set forth in claim 2.

7. A rubber product resulting from the method set forth in claim 3.

8. A vulcanized rubber product resulting from the method set forth in claim 4.

9. The method of retarding the deterioration of rubber which comprises treating rubber with 2, 2, 4-trimethyl-6-phenoxy-1, 2-dihydroquinoline.

10. The method of retarding the deterioration of rubber which comprises vulcanizing rubber in the presence of 2, 2, 4-trimethyl-6-phenoxy-1, 2-dihydroquinoline.

11. A rubber product resulting from the method set forth in claim 9.

12. A vulcanized rubber product resulting from the method set forth in claim 10.

RAYMOND F. DUNBROOK.
BINGHAM J. HUMPHREY.

CERTIFICATE OF CORRECTION.

Patent No. 2,165,623.                                               July 11, 1939.

RAYMOND F. DUNBROOK, ET AL.

It is hereby certified that error appears in the printed specification of the above numbered patent requiring correction as follows: Page 2, first column, line 19, claim 1, strike out "alkoxy and aroxyl" and insert instead the word aroxy; and that the said Letters Patent should be read with this correction therein that the same may conform to the record of the case in the Patent Office.

Signed and sealed this 22nd day of August, A. D. 1939.

(Seal)                                               Leslie Frazer
                                                     Acting Commissioner of Patents.